United States Patent [19]

Bretaudeau et al.

[11] Patent Number: 4,642,469
[45] Date of Patent: Feb. 10, 1987

[54] THREE-DIMENSIONAL REFLECTORS FOR OBJECT ATTITUDE RECOGNITION

[75] Inventors: Francis Bretaudeau, Fontenay-Aux-Roses; Marc Sarazin, Paris, all of France

[73] Assignee: Office National d'Etudes et de Recherches Aerospatiales, France

[21] Appl. No.: 686,684

[22] Filed: Dec. 27, 1984

[30] Foreign Application Priority Data

Dec. 27, 1983 [FR] France ............................. 83 20862
Dec. 27, 1983 [FR] France ............................. 83 20863

[51] Int. Cl.$^4$ ............................................ G01V 9/04
[52] U.S. Cl. ................................. 250/561; 350/630
[58] Field of Search ............... 250/561; 350/629, 630; 356/4; 362/348

[56] References Cited

U.S. PATENT DOCUMENTS 2,961,926 11/1960 Hoffmeister .................. 350/629 X
4,173,036 10/1979 Ferguson ....................... 362/348 X Primary Examiner—Eugene R. LaRoche
Assistant Examiner—Steven J. Mottola
Attorney, Agent, or Firm—Lowe, Price, LeBlanc, Becker & Shur

[57] ABSTRACT

A three-dimensional reflector for object attitude detection responds to illumination from a radiating source to produce a discrete array of light points aligned along a locus on the reflector. The array is characteristic of the reflector position with respect to the radiating source. The reflector has a corrugated surface formed with plural, parallel and spatially periodic, adjacent undulations, each having a crest and a trough. The undulations are arranged such that the locus runs through the reflector center of symmetry and the foot point of a perpendicular dropped by a detector for the array onto the surface. The foot point is a determinate point of the locus.

12 Claims, 23 Drawing Figures

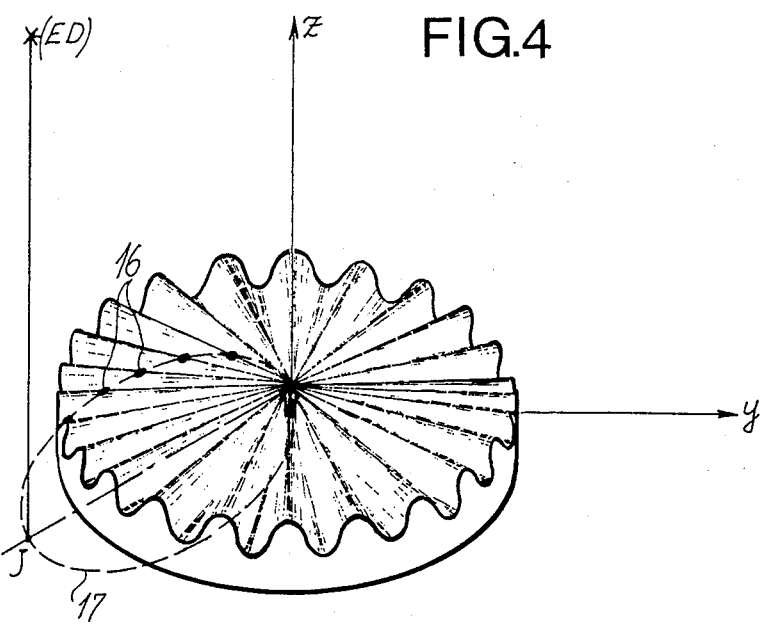
FIG.4
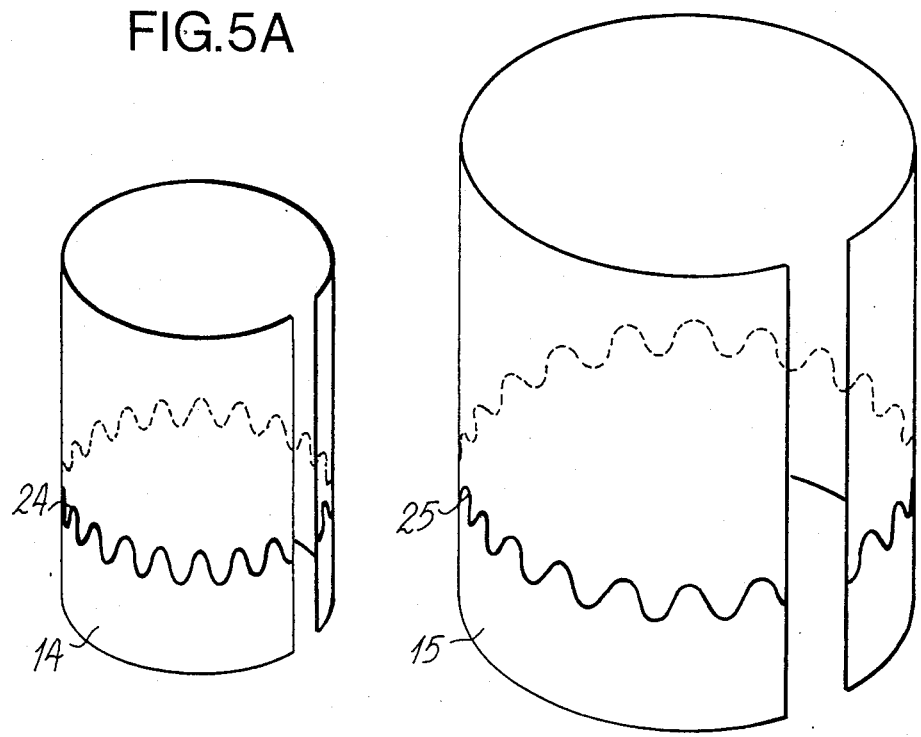
FIG.5A
FIG.5B

THREE-DIMENSIONAL REFLECTORS FOR OBJECT ATTITUDE RECOGNITION

BACKGROUND OF THE INVENTION

1. Field of the Invention

The present invention relates to a three-dimensional pattern reflectors or reflective optical sensors for object attitude recognition.

The three-dimensional reflector embodied in the invention is such that its response to being illuminated by a source of radiation contains the necessary information for extracting the following parameters:
position of the reflector in a field of observation;
distance from the reflector to the illuminating and detecting station;
angular deviations between the reflector reference frame and the station reference frame;

The reflector response is quite distinct with respect to the background noise, thereby permitting identification thereof.

The response of the reflector embodying the invention to illumination is an array of discreet points the projections of which onto a plane are arranged in a curve that depends on the geometric structure of the reflector and the position thereof with respect to the radiating source.

The reflector embodying the invention are formed of a reflective surface that is spatially or locally periodic, carrying substantially parallel undulations and describing a certain geometric shape. When such a reflector is illuminated by a scanning beam or by an overall illuminating beam emitted by a transmitter, the beam, when it falls onto those points on the reflector where it coincides with the normal to the reflector surface, is reflected towards the transmitter where it is received by a detector arranged adjacently thereto and forming an imager therewith. The geometric location of the reflector points seen by the imager is the location of those points where the normals to said reflector run towards the imager.

Whenever the transmitter and detector are not adjacent, the location of the points the detector sees corresponds to that of the points where the normal to the reflector coincides with the line bisecting the angle formed by the directions joining the said points to the transmitter and to the detector.

The present invention also relates to a system for determining the position and the attitude of objects and, more particularly, a system of the kind in question that makes use of three-dimensional reflectors for object attitude recognition.

2. Description of the Prior Art

French Pat. No. 1,570,810 filed June 10, 1968 disclosed a corrugated reflector having concentric circular undulations. This reflector acts as a driving mirror for motor-cars and converts the image of a traffic light into a plurality of luminous points rectilinearly aligned. The point where the perpendicular from the traffic light falls onto the mirror is indeterminated and the mirror cannot serve to recognize the attitude of objects.

SUMMARY OF THE INVENTION

The points of the reflector illuminated and detected by the imager are spread over a straight or curved alignment running through the center of the reflector and through the projection of the imager onto the plane of a flate reflector or the equatorial plane of a spherical reflector. Reflectors with concentric circular corrugations, reflectors with corrugations running out radially from a center, reflectors with both circular and radial corrugations and reflectors with hyperbolic corrugations will be disclosed in the following, all these reflectors being flat. Depending on the type of reflector, the points seen by the detector are spread out in a straight line, in a circle, in both a straight line and a circle, or in an equilateral hyperbola. We shall also describe spherical reflectors in which the reflector surface points seen by the detector are projected onto the equatorial plane of the spherical reflector along a diameter of said equatorial plane.

In accordance with the invention, the object for which the attitude and/or distance parameters are being sought carries at least two reflectors with one family of corrugations or a single reflector with two families of corrugations and these reflectors reflect at least two alignments of light points towards the detector that run through the detector projection on the reflector plane if the radiation detector and transmitter coincide, or through the projection of the mid-point of the segment joining the emitter and the detector if they do not coincide. The reflector plane is thus established with respect to a reference frame about the detector; it lies perpendicular to the straight line of sight from the detector to the said point of projection.

The first step is to establish the equations for the surface of the reflectors.

GENERAL CASE

In the general case, the transmitter E and the detector D do not coincide.

Let:

$x_E, y_E, z_E$ be the transmitter E coordinates;

$x_D, y_D, z_D$ be the detector D coordinates;

x, y, z be the coordinates of the running point P of the reflector; and $N(x, y, z) = 0$ be the equation of the reflector in the x, y, z reference frame with the origin at O, the center of the reflector reference frame.

For the point P to be seen by the detector D, then the following conditions must exist:

$$\begin{aligned}\frac{\partial N}{\partial x} &= \lambda [\|\vec{PD}\| (x_E - x) + \|\vec{PE}\| (x_D - x)] \\ \frac{\partial N}{\partial y} &= \lambda [\|\vec{PD}\| (y_E - y) + \|\vec{PE}\| (y_D - y)] \\ \frac{\partial N}{\partial z} &= \lambda [\|\vec{PD}\| (z_E - z) + \|\vec{PE}\| (z_D - z)]\end{aligned} \quad (1)$$

where $\|\vec{X}\|$ is the Euclid's norm of the vector $\vec{X}$ and $\lambda$ is a real number.

The equation system (1) becomes simplified in two cases.

FIRST CASE

The transmitter E and the detector D are close together. It is possible then to write:

$$\|\vec{PD}\| = \|\vec{PE}\| = e$$

The equation system (1) becomes:

$$\frac{\partial N}{\partial x} = \lambda e \, [x_E + x_D - 2x]$$
$$\frac{\partial N}{\partial y} = \lambda e \, [y_E + y_D - 2y] \quad (2)$$
$$\frac{\partial N}{\partial z} = \lambda e \, [z_E + z_D - 2z]$$

SECOND CASE

The transmitter E and the detector D coincide. It is possible then to write:

$$\|\vec{PE}\| = \|\vec{PD}\| = e$$

and in addition:
$x_E = x_D = x_I;\ x_I = (x_E + x_D)/2$
$y_E = y_D = y_I;\ Y_I = (y_E + y_D)/2$
$z_E = z_D = z_I;\ z_I = (z_E + z_D)/2$ The equation system (1) becomes:

$$\frac{\partial N}{\partial x} = 2\lambda e \, (x_I - x)$$
$$\frac{\partial N}{\partial y} = 2\lambda e \, (y_I - y) \quad (3)$$
$$\frac{\partial N}{\partial z} = 2\lambda e \, (z_I - z)$$

By eliminating the term $2\lambda e$ from the equation system (3), the following is obtained:

$$x_I - x = (z_I - z)\left[\frac{\partial N}{\partial x} \Big/ \frac{\partial N}{\partial z}\right]$$
$$y_I - y = (z_I - z)\left[\frac{\partial N}{\partial y} \Big/ \frac{\partial N}{\partial z}\right] \quad (4)$$

FIRST EXAMPLE

The reflector equation has the form:

$$N(x,y,z) = z - f(\rho) = 0 \quad (5)$$

If:

$$\rho = (x^2 + y^2)^{\frac{1}{2}} \quad (6)$$

Then:

$$\frac{\partial N}{\partial x} = -\frac{\partial f}{\partial \rho} \cdot \frac{x}{\rho};\ \frac{\partial N}{\partial y} = -\frac{\partial f}{\partial \rho} \cdot \frac{y}{\rho};\ \frac{\partial N}{\partial z} = 1 \quad (7)$$

Since (4) and (7) give:

$$\frac{\partial N}{\partial y} \Big/ \frac{\partial N}{\partial x} = y/x = \frac{y_I}{x_I} \quad (8)$$

the projections of the points seen by the imager lie on a straight line running through the imager projection on the reflector plane and through the center $P_0$ of the reflector $x = y = 0$. This point $P_0$ is also the origin O.

Should E and D be closed but not coincident, $x_I$ and $y_I$ are replaced by $(x_E + x_D)/2$ and $(y_E + y_D)/2$, or in other words the imager is replaced by the middle point of the segment joining the transmitter to the detector.

SECOND EXAMPLE

The reflector equation has the form:

$$N(x,y,z) = z - f(\theta) = 0 \quad (9)$$

If: $\theta = \tan^{-1}(y/x)$,
Then:

$$\frac{\partial N}{\partial x} = \frac{df}{d\theta} \, \frac{y}{x^2 + y^2}; \quad (10)$$

$$\frac{\partial N}{\partial y} = \frac{df}{d\theta} \, \frac{-x}{x^2 + y^2};\ \frac{\partial N}{\partial z} = 1$$

By substituting the values (9) for $\partial N/\partial x$ and $\partial N/\partial y$ in equations (4), the following is obtained $$\left[x - \frac{x_I}{2}\right]^2 + \left[y - \frac{y_I}{2}\right]^2 = \left[\frac{\rho_I}{2}\right]^2 \quad (11)$$

with $\rho_I = (x_I^2 + y_I^2)^{\frac{1}{2}}$

Equation (11) describes a circle with a radius $\rho_I/2$ running through the origin and the point $(x_I, y_I)$ that is the projection of the imager on the reflector plane.

THIRD EXAMPLE

The reflector equation has the form:

$$N(x,y,z) = z - f(x^2 - y^2) = 0 \quad (12)$$

If: $u = x^2 - y^2$, then:

$$\frac{\partial N}{\partial x} = -\frac{df}{du} \cdot 2x;\ \frac{\partial N}{\partial y} = \frac{df}{du} \cdot 2y;\ \frac{\partial N}{\partial z} = 1 \quad (13)$$

By substituting the values (12) into equations (4), the following is obtained:

$$\left[x - \frac{x_I}{2}\right]^2 \cdot \left[y - \frac{y_I}{2}\right]^2 = \frac{x_I y_I}{4} \quad (14)$$

Equation (13) describes an equilateral hyperbola running through the origin and the point $(x_I, y_I)$ that is the projection of the imager on the reflector plane.

FOURTH EXAMPLE

With reference to FIG. 7, jumping ahead, a sphere is represented in cartesian coordinates x, y, z and in spherical coordinates $\phi$, $\psi$, z. The radius R of the sphere is a periodic function of the latitude $D(\omega)$.

The equation for the spherical reflector is then:

$$N(x,y,z) = x^2 + y^2 + z^2 - D2(\psi) = 0 \quad (15)$$

$\psi$ is related to z by:

$$\tan \psi = z/R$$

where $R = (x^2 + y^2)^{\frac{1}{2}}$

The partial derivatives of N with respect to the coordinates may be expressed as:

$$\left. \begin{array}{l} \frac{\partial N}{\partial x} = 2x \left[ 1 + \frac{D'(\Psi)}{D(\Psi)} \cdot \frac{z}{R} \right] \\ \frac{\partial N}{\partial y} = 2y \left[ 1 + \frac{D'(\Psi)}{D(\Psi)} \cdot \frac{z}{R} \right] \\ \frac{\partial N}{\partial z} = 2z - 2 \frac{D'(\Psi)}{D(\Psi)} \cdot R \end{array} \right\} \quad (16)$$

These partial derivatives must satisfy equations (2) in relation to the case where the transmitter and detector are close together, thus giving:

$$y = \frac{y_E + y_D}{x_E + x_D} \cdot x \quad (17)$$

It results from the above that the projections of the points seen by the imager in the plane $z=0$ are aligned on a straight line running through the center of the reflector and through the projection on the plane $z=0$ of the middle point of the segment joining the transmitter to the detector. When the transmitter and detector coincide, the alignment straight line runs through the imager projection on the plane $z=0$.

BRIEF DESCRIPTION OF THE DRAWING

The invention will now be described in detail in relation to the appended drawings in which:

FIGS. 4, 5A and 5B are views in perspective showing a planar reflector in which the points seen by the detector are distributed over a circle;

DESCRIPTION OF THE PREFERRED EMBODIMENTS

Figure 1:
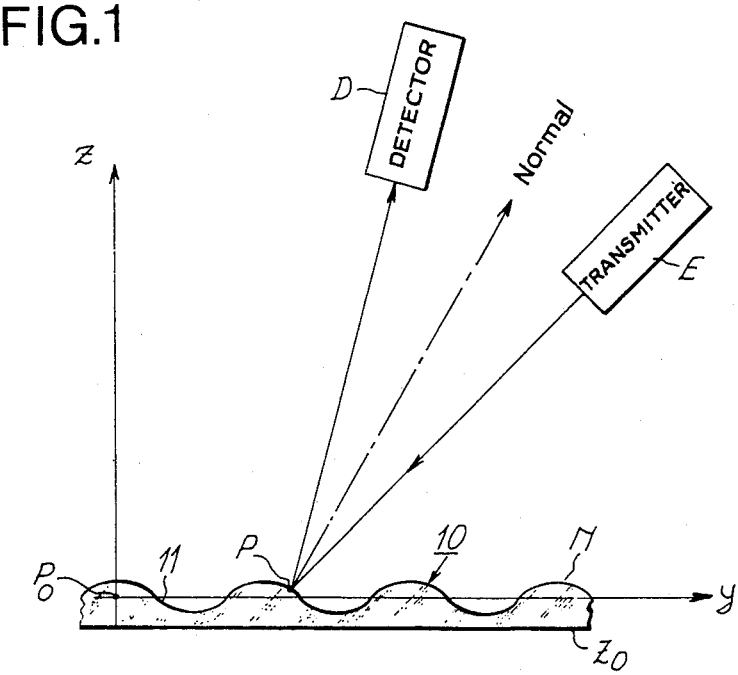
FIG. 1 is a geometric diagram showing the condition a scanning beam from a transmitter that falls on a reflector embodying the invention must satisfy in order to be received by a detector separate from the transmitter.

With reference to FIG. 1, block E represents a light transmitter such as a laser source and block D represents a detector such as a photodetector or a camera. P indicates a running point on the surface N of reflector 10. Point P is seen by the detector if the normal at P to the surface N coincides with the line bisecting the angle EPD. If so, the partial derivatives of $N(x, y, z)$ with respect to the coordinates satisfy equations (1).

Figure 2:
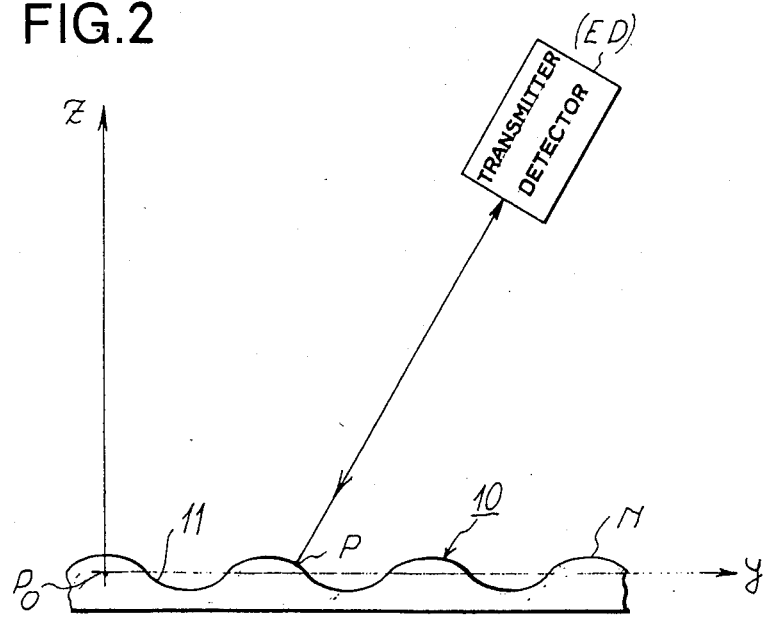
FIG. 2 is a geometric diagram showing the condition a scanning beam from a transmitter that falls on a reflector embodying the invention must satisfy in order to be received by a detector coincident with the transmitter.

In FIG. 2, the transmitter E and detector D coincide at (ED). The illuminated point is seen by D if the normal to the surface N runs through (ED).

For the sake of simplicity, the following examples involve solely period distributions of the reflector undulations.

FIRST EXAMPLE
(FIG. 3)

The reflector equation is given by:

$$z = A \cos (2\pi \rho / \lambda)$$

where A and $\lambda$ are constants and $\rho = (x^2 + y^2)^{\frac{1}{2}}$. In the plane xOz, the cross-section of reflector 10 is a cosine curve 11:

$z = A \cos (2\pi x / \lambda)$ with a spatial period $\lambda$. The reflector surface is generated by rotation of the cosinusoid about the axis Oz. It takes the form of circular undulations 12. The central undulation could be a trough and, if the generatrix were sinusoidal instead of cosinusoidal, then there would be a sharp point standing proud or in a hollow at the origin. The position of the plane $z = z_0$ that limits the plane rearwards is arbitrary.

Figure 3:
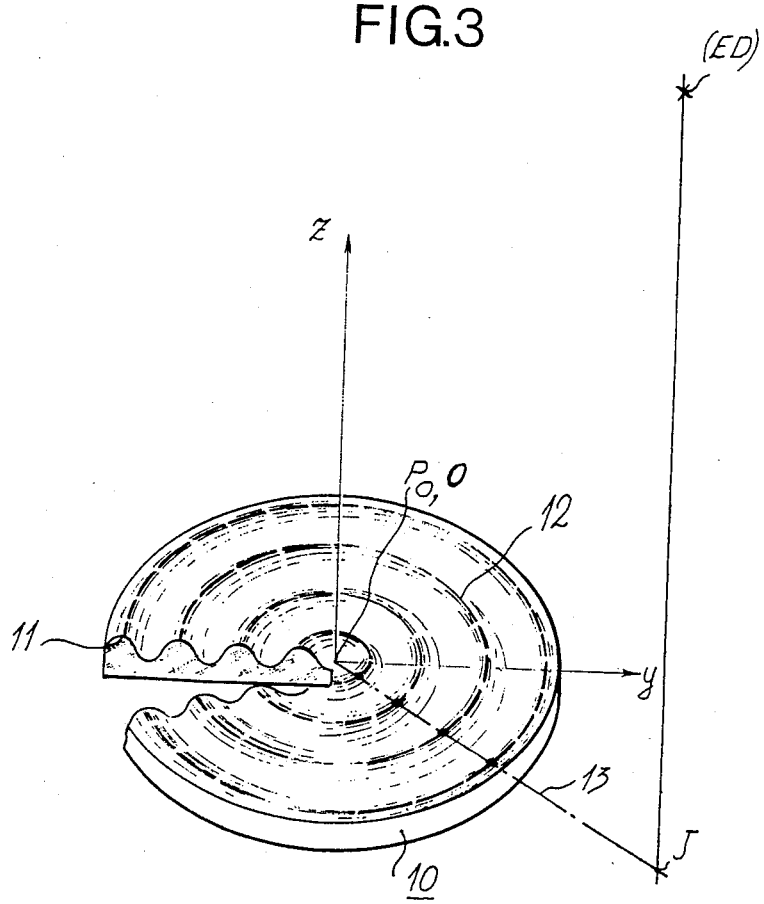
FIG. 3 is a view in perspective showing a planar reflector in which the points seen by the detector are distributed over a straight line.

FIG. 3 depicts the projection J of the imager (ED) and the location of the points seen by the detector as represented by the straight line 13 running through J and $P_0$, the center of the reflector 10. J is a point on the straight line 13 which is indeterminate. Reflector 10 alone cannot serve to recognize an attitude.

SECOND EXAMPLE
(FIGS. 4, 5A and 5B)

The reflector equation is given by:

$$z = A \cos k\theta$$

where A and k are constants. Undulations 14 are no longer orthoradial as in FIG. 3 but are radial.

The reflector cross-section through cylinders 14, 15 coaxial with axis Oz are sinusoids 24, 25 (FIGS. 5A and 5B) the positive and negative peaks of which are aligned on the origin $P_0$. Points 16 seen by the detector are arranged in a circle 17 with a diameter $P_0J$ where J is the imager projection (ED) in the reflector plane. Point J is a determinate point of circle 17 which is diametrally opposite point $P_0$.

THIRD EXAMPLE
(FIG. 6)

Figure 6:
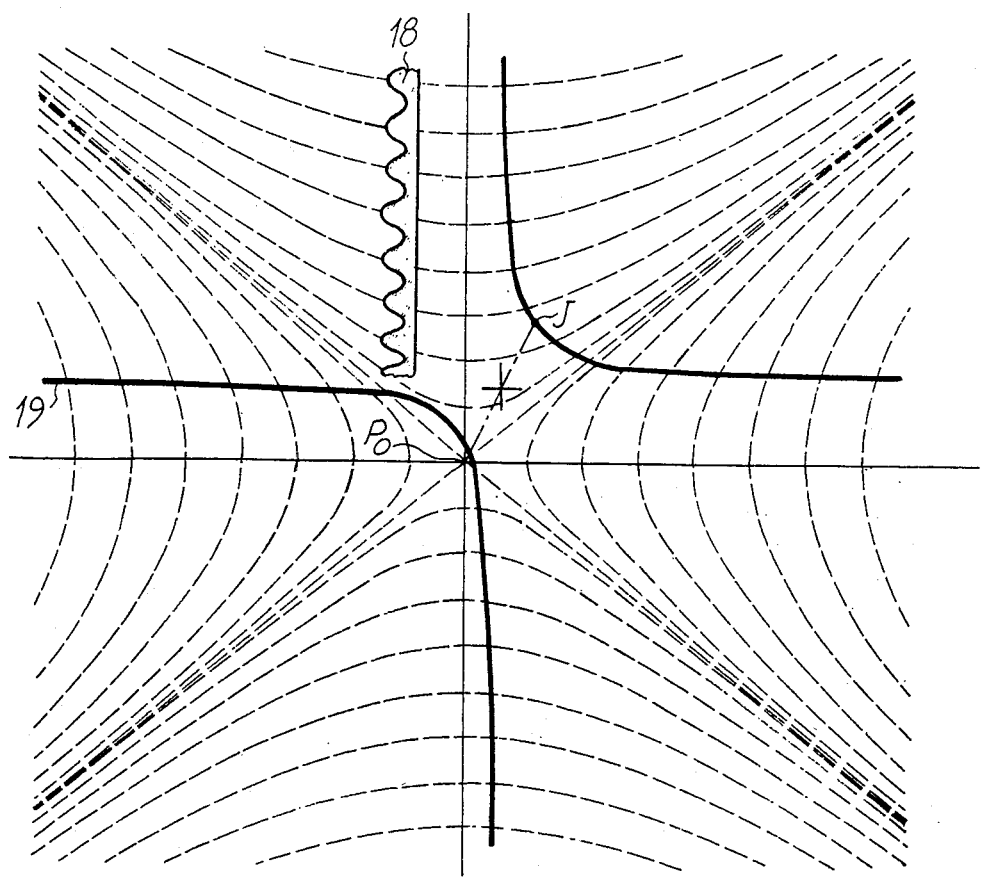
FIG. 6 represents a planar reflector in which the points seen by the detector are distributed over an equilateral hyperbola.

In FIG. 6, the reflector equation is $z=A \cos(2\pi u/\lambda)$ where $u=x^2-y^2$. Undulations 18 are substantially hyperbolae shape where the bisecting lines are asymptotes, and are parallel. The points seen by the detector are distributed over an equilateral hyperbola 19 with asymptotes parallel to the coordinate axes. This equilateral hyperbola 19 runs through $P_0$, the center of the reflector, and the imager projection J on the reflector plane.

Point J in FIG. 6 is a well determinate point. It is the symmetric of point $P_0$ with respect to the point of intersection of the asymptotes of the locus of the illuminated points.

FOURTH EXAMPLE

Figure 7:
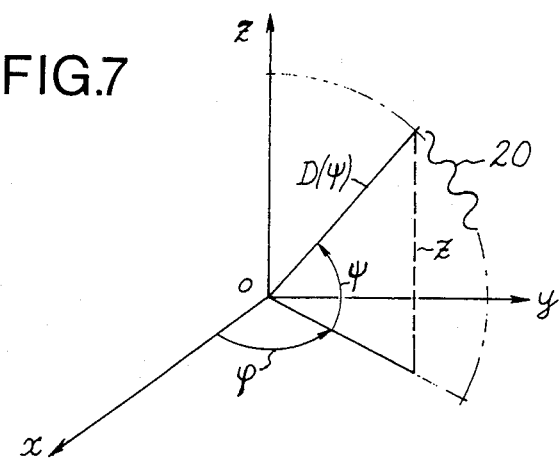
FIGS. 7 and 8 represent a spherical reflector in which the radius is periodically dependent on the latitude.

FIG. 7 has already been discussed. It shows that the radius of the sphere is a periodic function of the latitude and enables formulae (15) to be established.

FIG. 7 represents latitude undulations 21 on sphere 20 that are peaks and grooves circular in shape with axis Oz. The projections of the points seen by the detector on the plane xOy are distributed over a straight line 22 running through $P_0$ and through the projection J of the imager (ED) on the plane xOy. This straight line is a diameter of the sphere. On the sphere, the points seen by the detector lie on a great circle 23.

The prime advantage of the spherical reflector is that the apparent length of the straight line formed by the bright points seen by the detector is substantially constant whatever the inclination of the rays in the beam with respect to the axis of the spherical reflector.

The reflectors embodying the invention make it possible to determine straight or curved alignments on the basis of which the distance and the attitude of an object wiht respect to a reference frame can be calculated.

Furthermore, an aperiodic distribution of undulations enables coding to be carried out on the distribution of discrete points along the aforesaid alignments for the purpose of discrimination between several reflectors.

Figure 9:
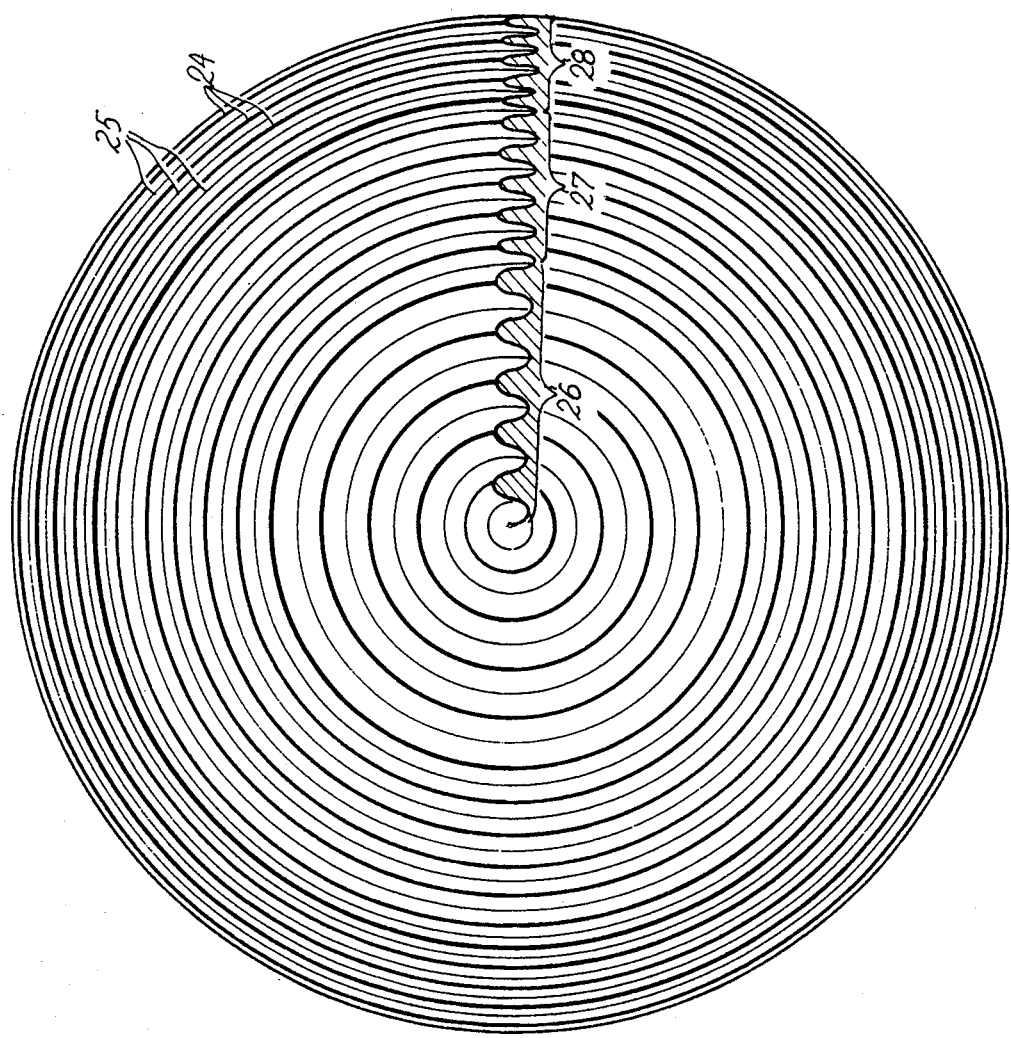
FIGS. 9 and 10 respectively represent reflectors derived from those in FIGS. 3 and 4 in which the orthoradially circular (FIG. 3) and radially rectilinear (FIG. 4) undulations are arranged in groups of undulations with different spatial periods.

FIG. 9 shows a non-periodic reflector derived from the reflector in FIG. 3 in which the undulations are not periodic. The bold lines 24 are the tops of the undulations with sinusoidal thickness and the fine lines 25 are the troughs of these undulations. It can be seen in FIG. 9 that there are three groups 26, 27, 28 with five undulations each. The undulations are spatially periodic in each group but are not so from one group to another.

Figure 10:
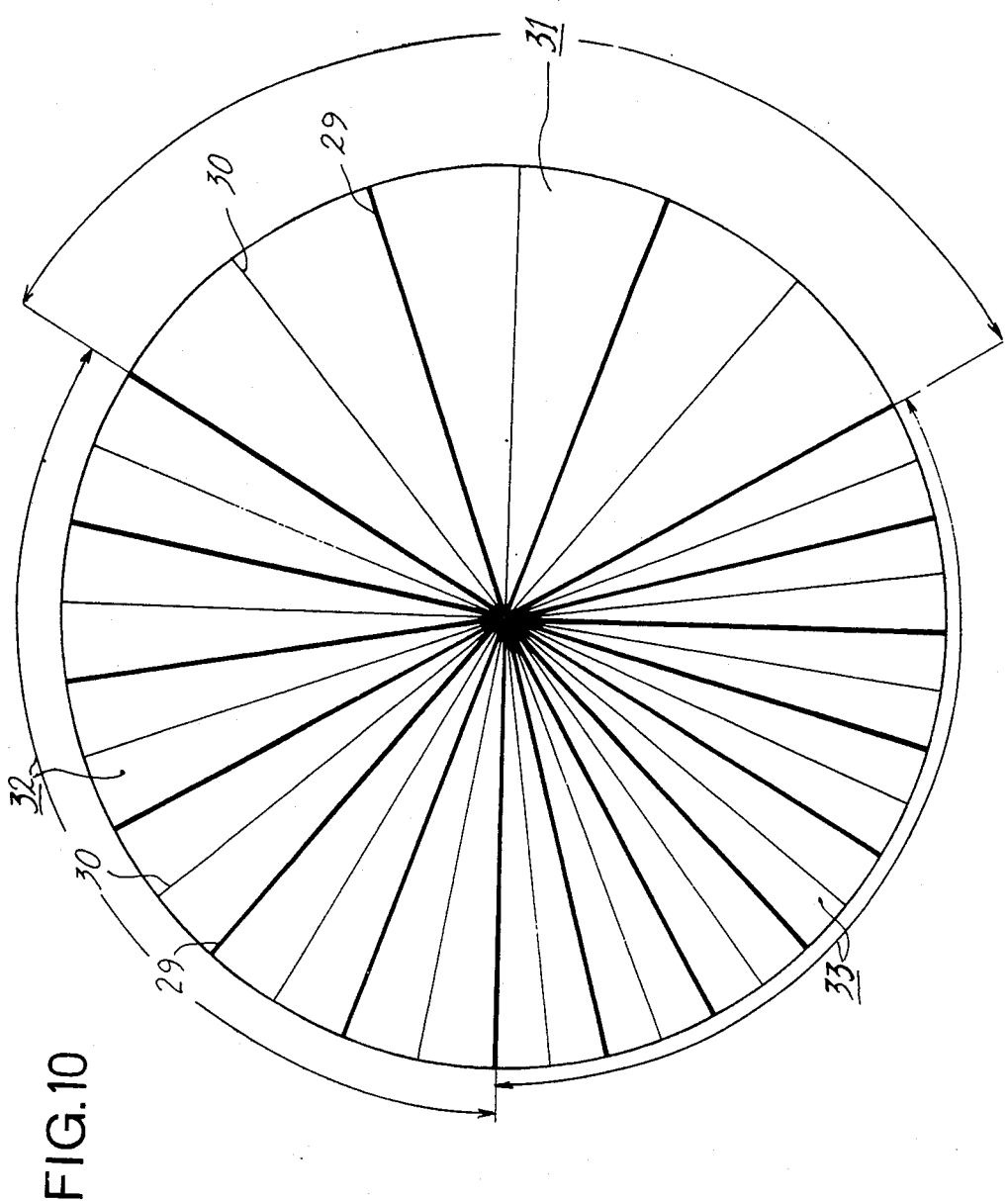

FIG. 10 shows a non-periodic reflector derived from the reflector in FIG. 4 in which the undulations are not periodic. The bold lines 29 are the tops of the undulations with sinusoidal thickness and the fine lines 30 are the troughs of these undulations. It can be seen in FIG. 10 that there are three groups 31, 32, 33 with 3, 6 and 8 undulations respectively. The undulations are spatially periodic in each group but are not so from one group to another.

Figure 11:
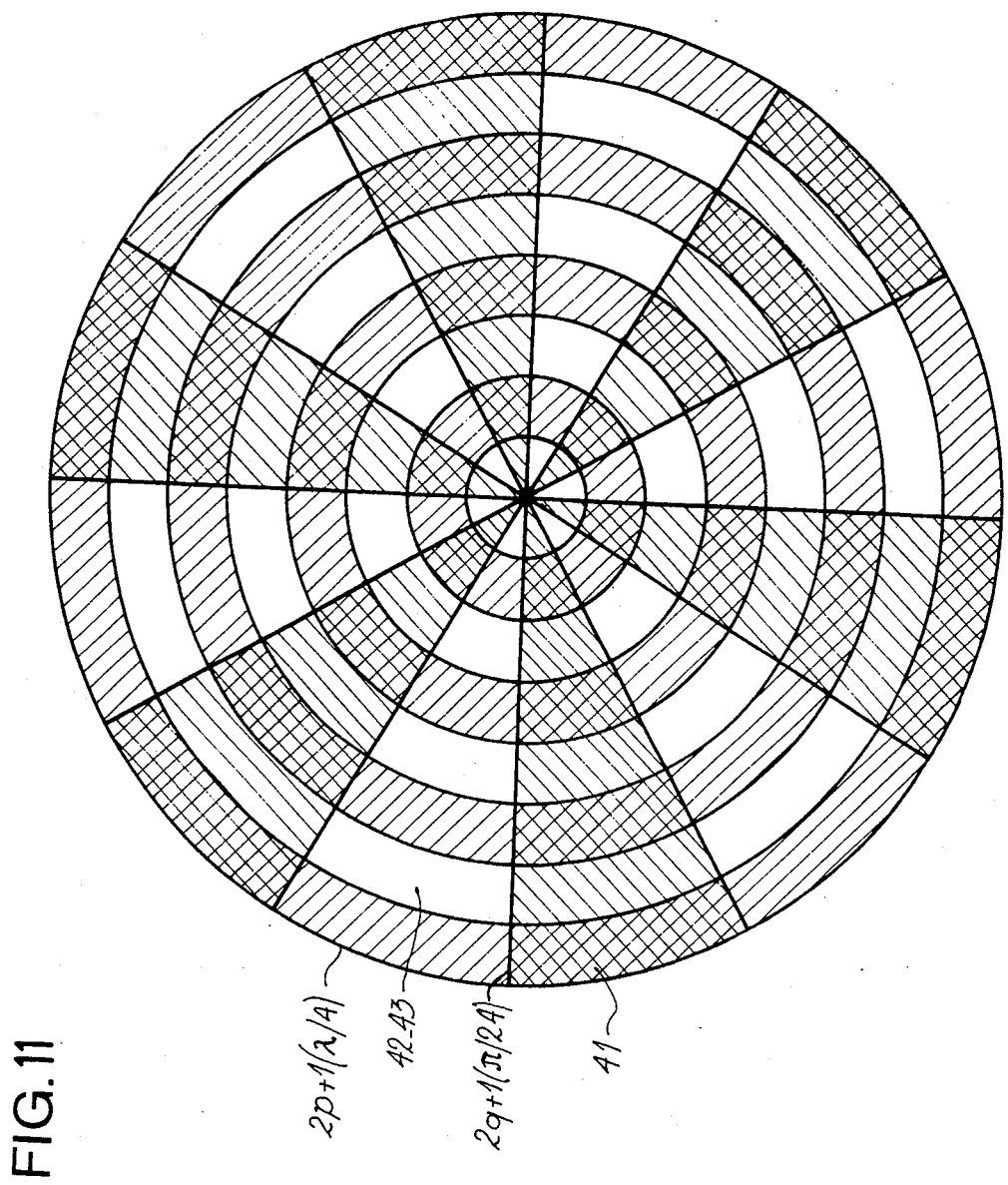
FIG. 11 represents a reflector having both radial and orthoradial undulations.

FIG. 11 represents a reflector having both, or at least partially, the orthoradial undulations of the reflector in FIG. 3 and the radial undulations of the reflector in FIG. 4. It results from this that the illuminated points seen by the detector lie both on a straight line and on a circle that cross at the center of the reflector and at the imager projection point J on the reflector plane. The point J is therefore determined by just one reflector.

To obtain the reflector in FIG. 11, the following surfaces are constructed:

$$z_1 = A \cos(2\pi \rho/\lambda) \qquad (18)$$

and $$z_2 = A \cos k\theta \qquad (19)$$

If $z_1$ and $z_2$ are positive, the greater of the two is kept. If $z_1$ and $z_2$ are negative, the smaller of the two is kept. If $z_1$ is positive and $z_2$ negative, $z_1$ is kept. If $z_1$ is negative and $z_2$ positive, $z_2$ is kept. The shaded areas in FIG. 11 depict the areas on the reflector where $z_1$ is positive and where $z_2$ is positive by respectively different shading. The parts that are double shaded are where $z_1$ and $z_2$ are simultaneously positive (area 41). Those parts left blank (42) are where $z_1$ and $z_2$ have opposite signs (the positive one is then kept) or (43) where $z_1$ and $z_2$ are both negative (the smallest is kept). Areas 42 raise no problem and areas 43 are treated like areas 41.

In FIG. 11, the circles of radius $\lambda/4$, $3\lambda/4$, ... $(2p-1)\lambda/4$, ... $(2p+1)\lambda/4$ are marked out on which $z_1$ is zero and the directional straight lines $$\theta = \frac{(2q-1)\pi}{2k}, \theta = \frac{(2q+1)\pi}{2k}, \theta = \frac{(2q+3)\pi}{2k}$$

with $k=12$, i.e.:

$$\theta = \frac{(2q-1)\pi}{24}, \theta = \frac{(2q+1)\pi}{24}, \theta = \frac{(2q+3)\pi}{24}$$

on which $z_2$ is zero.

FIG. 12 represents a reflector portion formed of circles 44 and 45:

$$\rho=(2p-1)\pi/2 \text{ and } \rho=(2p+3)\pi/2$$

and by the straight lines 47 and 48:

$$\theta=(2q-1)\pi/24 \text{ and } \theta=(2q+3)\pi/24$$

Additionally, circle 46 has been plotted:

$$\rho=(2p+1)\pi/2$$

as has straight line 49:

$$\theta=(2q+1)\pi/24$$

Figure 12A:
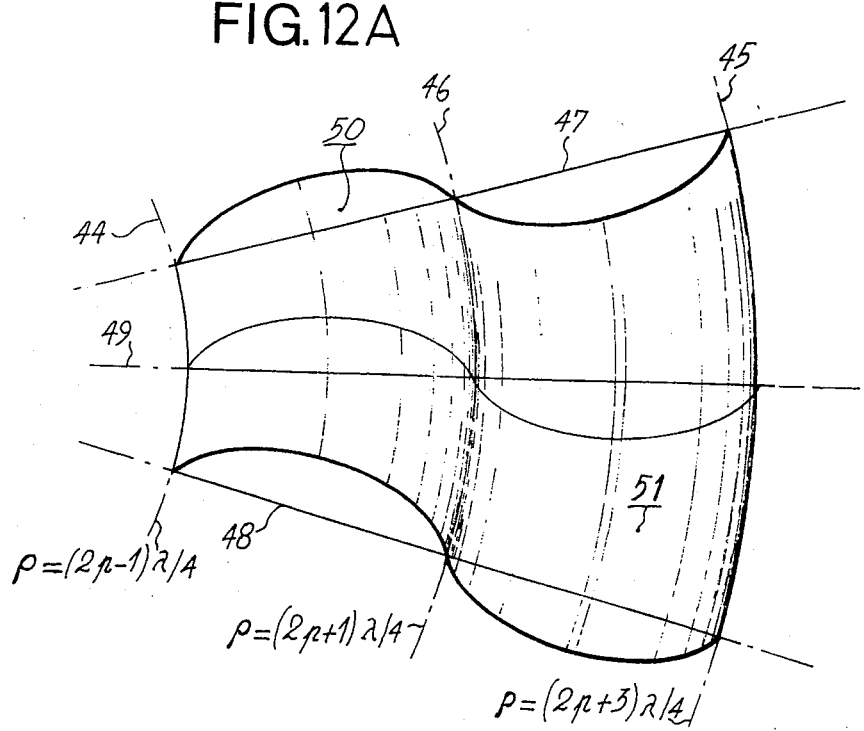
FIGS. 12a, 12b, 12c are diagrams explaining the geometric process making it possible to deduce the reflector in FIG. 11 and the reflectors in FIGS. 3 and 4.

Circles 44, 45 and 46 correspond to $z=0$ and lie in the plane xOy. FIG. 12a comprises two circular channels 50 and 51 the first of which stands proud and the second is hollow.

Figure 12B:
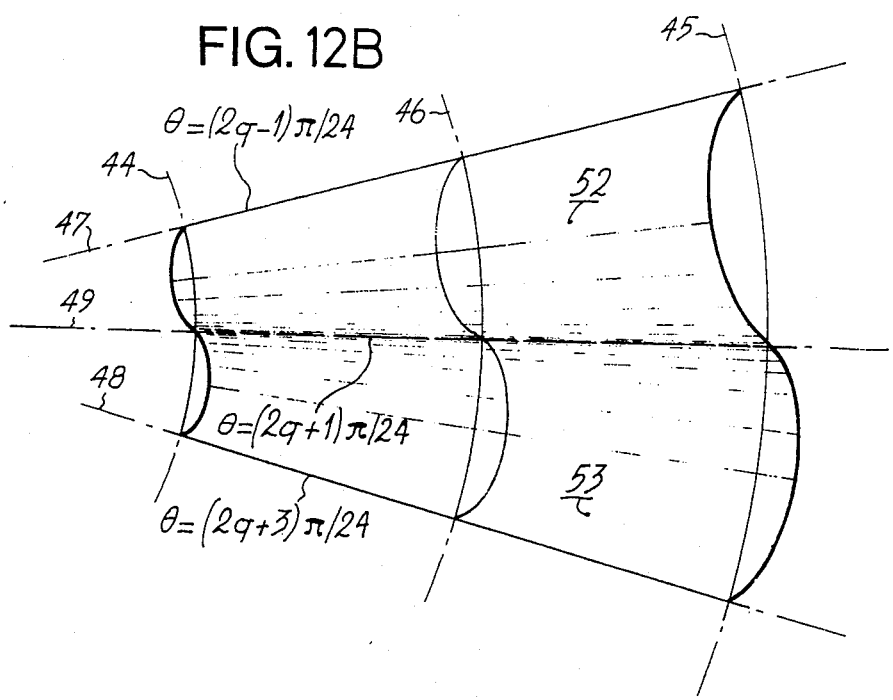

Circles 44, 45 and 46 and straight lines 47, 48 and 49 are shown also in FIG. 12b. Straight lines 47, 48 and 49 correspond to $z=0$ and lie in the plane xOy. FIG. 12b includes two rectilinear channels 52 and 53 the first of which stands proud and the second is hollow.

Figure 12C:
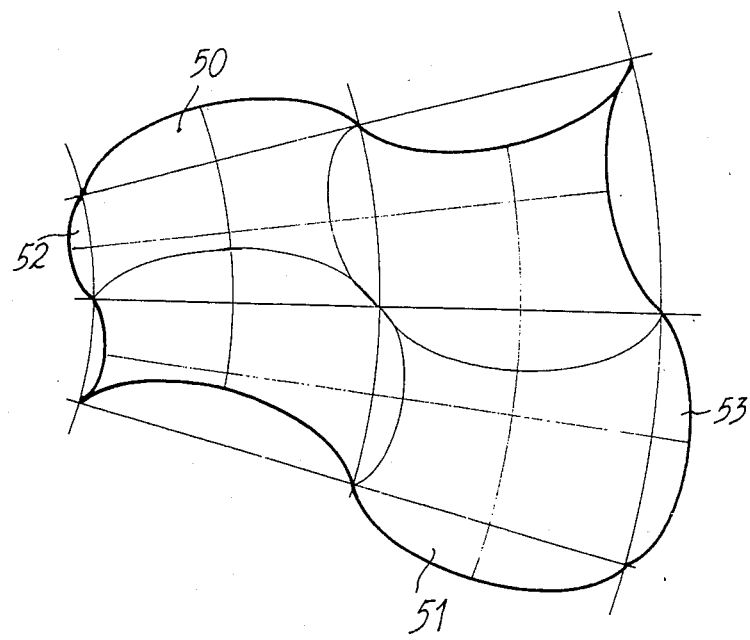

To build up FIG. 12c, the greater of $z_1$ and $z_2$ must be kept.

$z_1$ and $z_2$ are equal when $$\rho = k\lambda(\theta/2\pi) \qquad (20)$$

Equation (20) describes Archimeded spiral. It is replaced by $$(2q+1)(\pi/2k),$$

this gives $$\rho = (2q+1)(\lambda/4)$$

It can be seen that the spiral runs through the points where the circles: $\rho=(2p+1)\lambda/4$ and straight lines: $\theta=(2q+1)\pi/2k$ intersect.

Figure 13:
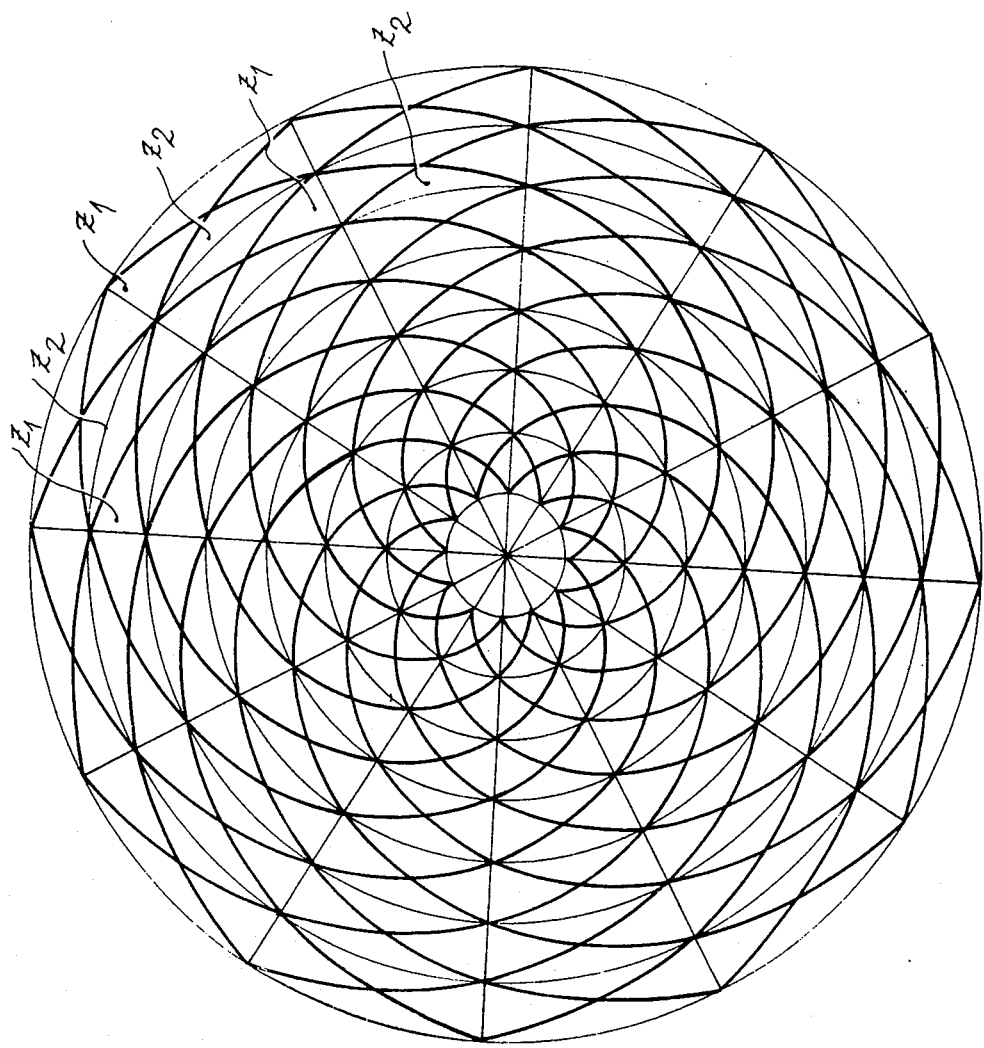
FIG. 13 is a further diagram explaining the construction of the reflector in FIG. 11 on the basis of the reflectors in FIGS. 3 and 4.

In FIG. 13, p has been varied from 0 to 7 and q from 0 to 11. An indication is given in each separate area as to whether it is spiral $z_1$ or $z_2$ depending on which is the greater in the area in question.

Figure 14:
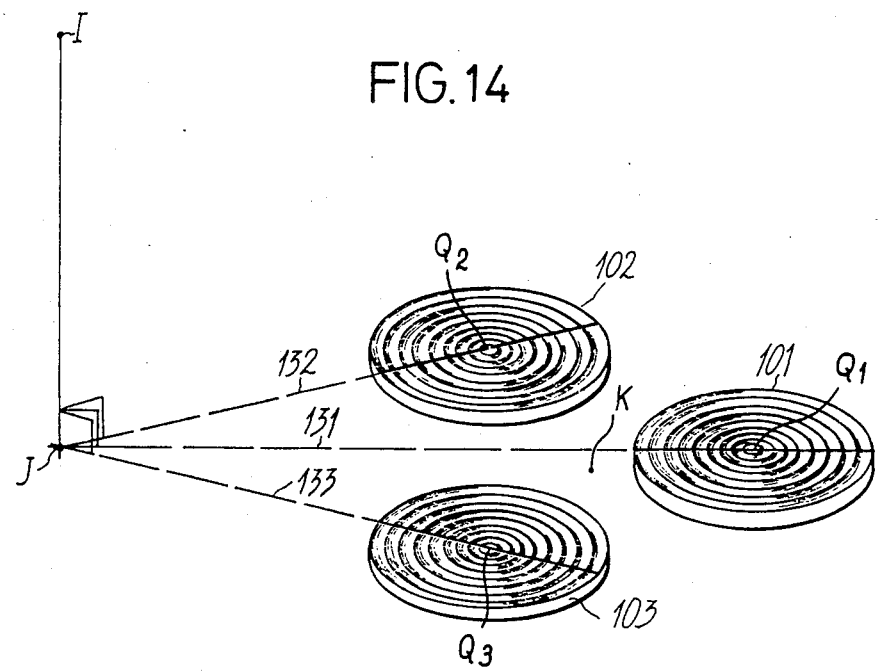
FIG. 14 depicts a first embodiment of a system for determining attitude and distance using the reflectors in FIG. 3.

FIG. 14 depicts a first embodiment of the attitude and position determining system as in the invention.

Three reflectors 101, 102, 103 of the type shown in FIG. 3 are arranged in the same plane and are located at the corners of an equilateral triangle. When the reflectors are illuminated, they send rectilinear luminous alignments 131, 132, 133 to the detector. These alignments cross at the point J and the straight line IJ (I detector) runs perpendicular to the reflector plane. When the reflectors are arranged at the corners of an isoceles triangle, or any other triangle, an additional indication is given as to their orientation.

It should be noticed that the point J of the perpendicular from I is an indeterminate point in the reflector of FIG. 3. Accordingly, at least two reflectors of the type of FIG. 3 are necessary for an attitude recognition.

Figure 15:
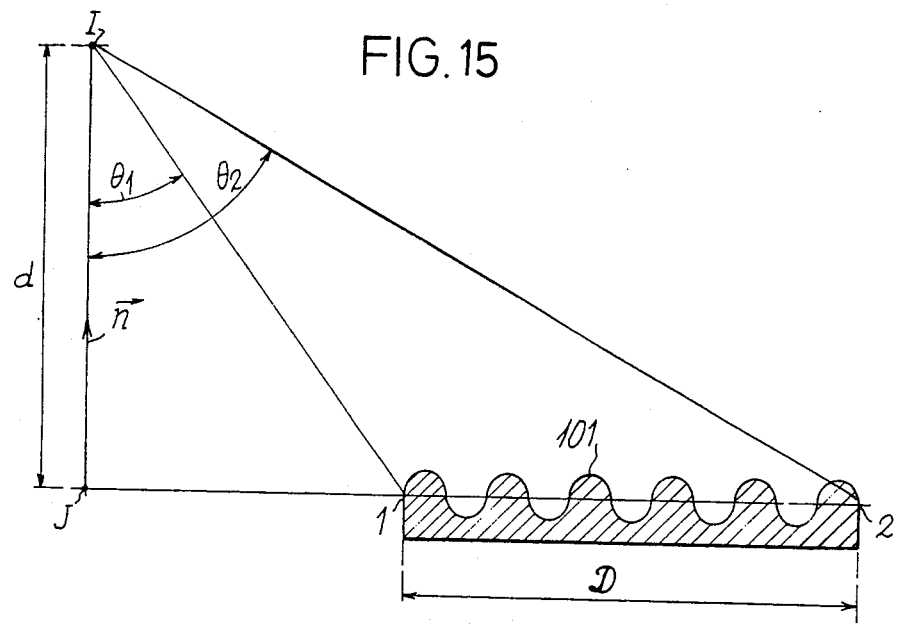
FIG. 15 explains how the distance between the detector and the reflector is determined when the reflector is of the type in FIG. 3.

FIG. 15 represents a diametral cross-section of reflector 101 in FIG. 14 along a plane running through the normal n to the point J. Ends 1 and 2 of the diameter $D$ of said reflector aligned along straight line 131 are seen by the detector through two angles, $\theta_1$ and $\theta_2$ with the normal n, and the distance d = IJ is given by the following formula:

$$d = \frac{D}{\tan\theta_2 - \tan\theta_1} \quad (21)$$

Figure 16:
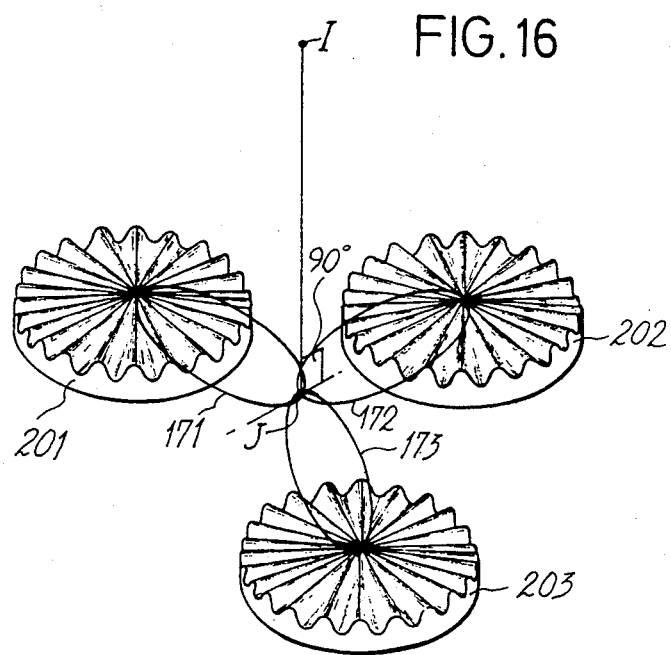
FIG. 16 depicts a second embodiment of a system for determining attitude and distance using the reflectors in FIG. 4.

FIG. 16 depicts a second embodiment of the attitude and position determining system.

Three reflectors 201, 202, 203 of the type in FIG. 4 are arranged in the same plane and are located at the corners of an equilateral triangle. When the reflectors are illuminated, they send circular luminous alignments 171, 172, 173 to the detector. These alignments cross at the point J and the straight line IJ (I, detector) runs perpendicular to the reflector plane. When the three reflectors are arranged at the corners of an isoceles triangle, or any other triangle, an additional indication is given as to their orientation.

Figure 8:
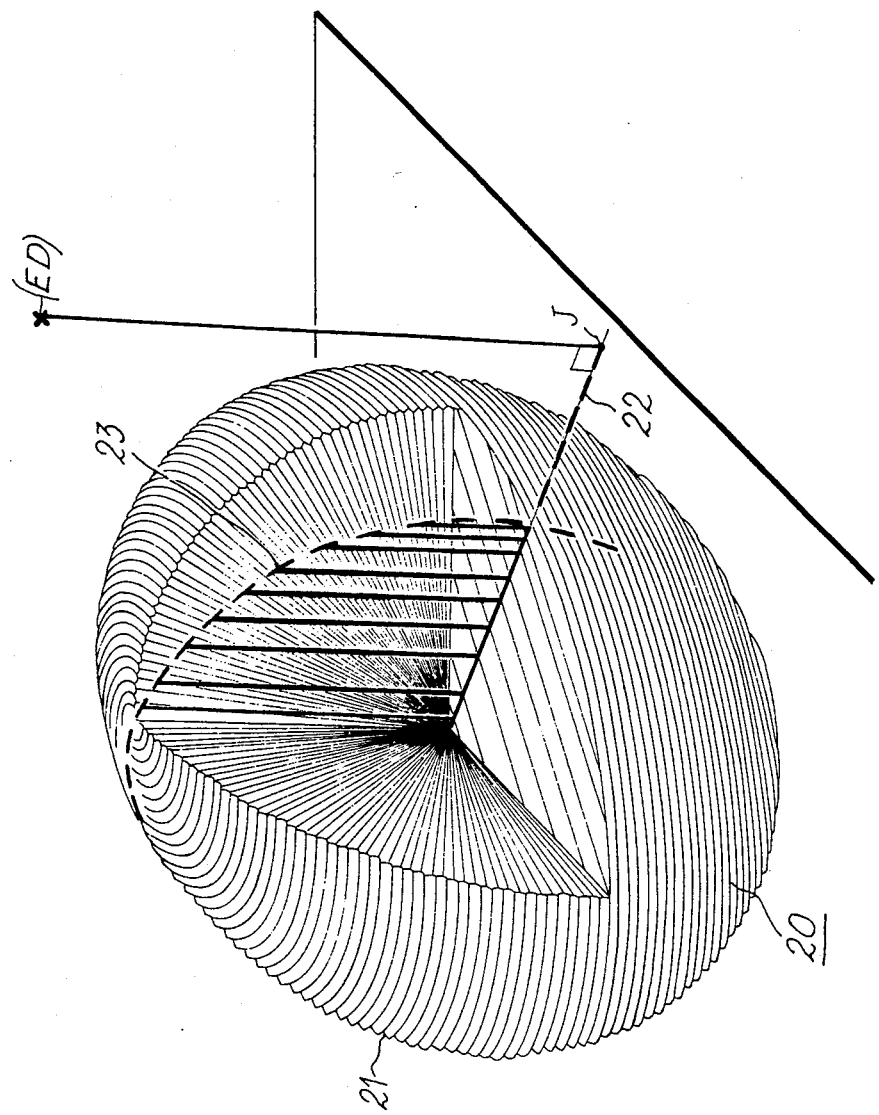

The leading advantage of the spherical reflector of FIG. 8 lies in that the apparent dimension of the segment formed by the points the detector sees is substantially constant whatever the detector (point I) attitude with respect to the center of the reflector for a given distance therebetween.

Figure 17:
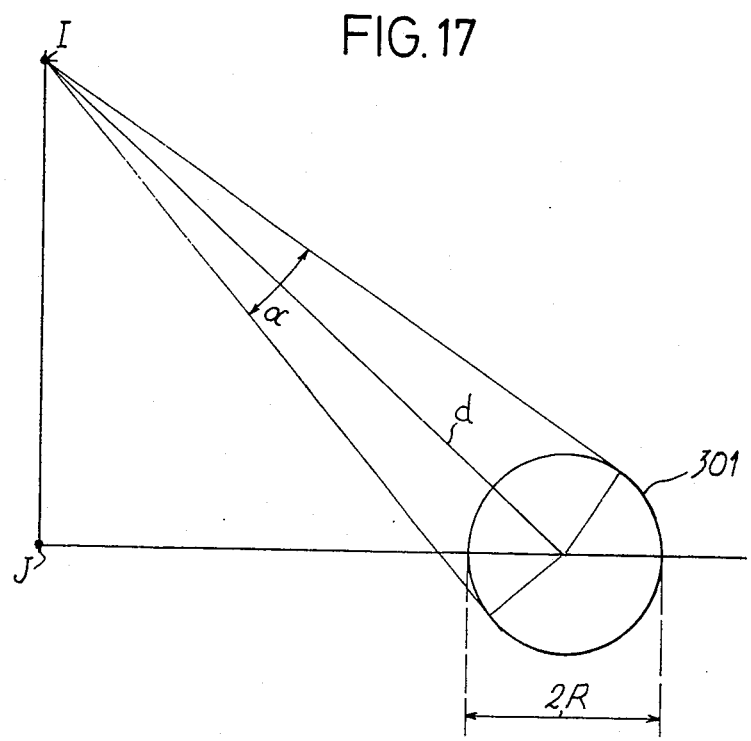
FIG. 17 explains how the distance between the detector and the reflector is determined when the reflector is of the type in FIG. 8.

FIG. 17 ressembles FIG. 15 except that flat reflector 101 with concentric circular corrugations is replaced by a spherical reflector 301. $\alpha$ is the angle through which the detector sees the spherical reflector and R is the radius of this reflector, whereupon the distance d is given by:

$$d = \frac{R\sqrt{2}}{\sqrt{1-\cos\alpha}} \quad (22)$$

It will be observed that should only the object position be sought after, then just one spherical reflector will suffice.

The three-reflector arrangement as described in relation to concentric circular corrugation reflectors and rectilinear radial corrugation reflectors can also be devised with other types of reflector described in the foregoing.

Such arrangements are readily conceived and there is no point in representing them specifically. It should be noted that when the alignments are straight lines, two reflectors are sufficient for determining the point J. If the alignment curves are circular, three reflectors are required in order to clear any doubt because two circles cross in two places. Lastly, for those reflectors presenting one straight line and one circle as far as alignments are concerned, one reflector will suffice.

Figure 18:
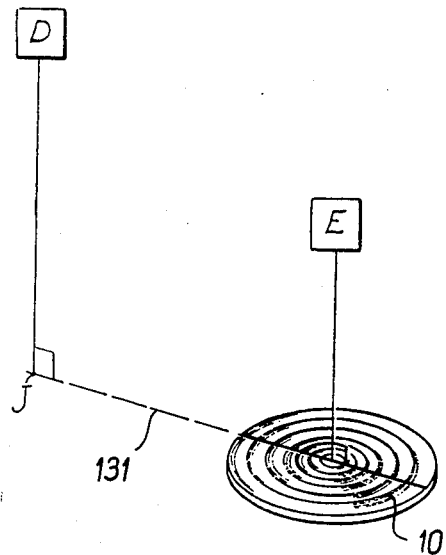
FIGS. 18 and 19 show the system as in the invention when the radiation transmitter and the detector do not coincide.
Figure 19:
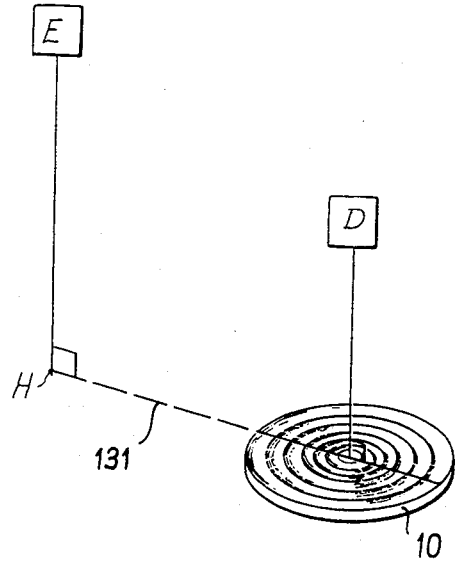

Up to this point, it has been assumed that the radiating source and the detector coincided. FIGS. 18 and 19 cover the case where these two items are separate. In FIG. 18, the source E is vertically above the centre of reflector 10. The marking alignments such as 131 converge on the point J, the detector's projection on the reflector plane. In FIG. 19, the detector D is vertically above the centre of reflector 10. The marking alignments such as 131 converge on the point H, the source's projection in the reflector plane.

The case put forward in FIG. 18 is particularly interesting since it enables the reflector and the source to be mounted on a body movable in the field of view and the detector in a fixed station.

Figure 20:
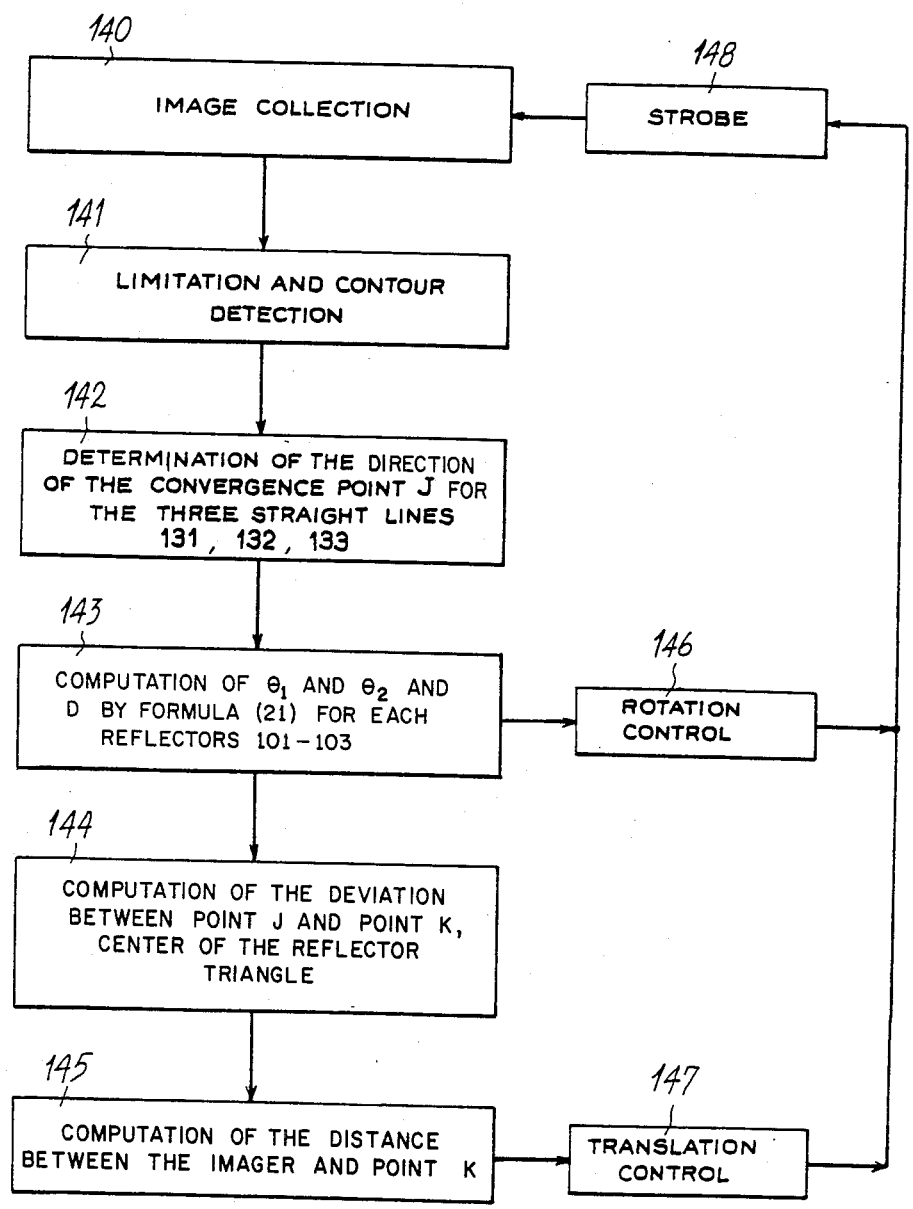
FIG. 20 depicts an example of a data processing system making use of the data collected by the detector.

An application of the attitude and distance determining system embodying the invention for the automatic guidance of self-propelled vehicles such as trucks will now be described in relation to FIGS. 19 and 20. The necessary computation circuitry is housed in the block close to the detector.

The detector consists of a charge coupled device (CCK) camera. FIG. 20 gives the system algorithm;
140: image collection;
141: limitation and contour detection;
142: determination of the location of the convergence point J of the three straight lines, 131, 132, 133;
143: measurement of $\theta_1$ and $\theta_2$ and computation of d by formula (21): $\theta_1$ and $\theta_2$ are measured for one or all reflectors;
144: computation of the deviation angle $Q_1JK$ (or $Q_2JK$ or $Q_3JK$) between point K the center of the triangle $Q_1, Q_2, Q_3$ formed by the centers of reflectors 101–103;
145: computation of the distance JK. Knowing the distance JK and the angle $Q_1JK$ (or $Q_2JK$ or $Q_3JK$) the imager is moved relative to the reflector assembly or the reflector assembly relative to the imager in order for the imager to project at point K on the reflector plane. The rotation of the imager (or the rotation of the reflector assembly) is implemented by circuit 146 controlled by circuit 144 and the translation of the imager (or the translation of the reflector assembly) is implemented by circuit 147 controlled by circuit 145.

What we claim is:

1. A reflector intended to be illuminated by a radiating source and to produce, in response to this illumination, a discreet array of light points aligned along a locus on said reflector, characteristic of the reflector position with respect to the radiating source, and intended to be detected by a detector means, said reflector having a center of symmetry and comprising a corrugated surface formed with a plurality of adjacent undulations, parallel and spatially periodic, each carrying a crest and a trough, said undulations being arranged such that said locus runs through the center of symmetry of the reflector and the foot point of the perpendicular dropped a detector means onto said surface, said foot point being a determinate point of said locus.

2. The reflector claimed in claim 1 wherein the undulations are radialy rectilinear with respect to the center of symmetry, the locus of light points is a circle running through the center of symmetry and the foot point of the perpendicular dropped from the detector means onto the reflector surface is the point of said circle diametrally opposite to the center of symmetry.

3. The reflector claimed in claim 1 wherein the undulations are substantially in the shape of equilateral hyperbolae having their center at the reflector center of symmetry, the locus of light points is another equilateral hyperbola running through the center of symmetry and the foot point of the perpendicular dropped from the detector means onto the reflector surface is the point of said other hyperbola symmetric of the center of symmetry of the reflector with respect to the point of intersection of the asymptotes of said other hyperbola.

4. The reflector claimed in claim 1 wherein the corrugated surface of the reflector is substantially spherical, the undulations are substantially in the shape of latitude grooves on said spherical surface, the locus of light points is a great circle of the spherical surface which projects onto the equatorial plane of said spherical surface along a diameter of the same and the foot point of the perpendicular dropped from the detector means onto the reflector surface is a point of said diameter.

5. A reflector intended to be illuminated by a radiating source and to produce in response to this illumination a discreet array of light points aligned along a locus on said reflector, characteristic of the reflector position with respect to the radiating source and intended to be detected wy a detector means, said reflector having a center of symmetry and comprising a corrugated surface formed with a plurality of adjacent undulations, parallel and spatially periodic, each carrying a crest and a through, said undulations being arranged such that said locus runs through the center of symmetry of the reflector and the foot point of the perpendicular dropped from the mid-point of the segment of straight line joining the radiating source to the detector means onto the reflector surface, said foot point being a determinate point of said locus.

6. The reflector claimed in claim 1 wherein the adjacent and parallel undulations have distinct spatial periods in the different areas of the reflector.

7. The reflector claimed in claim 1 characterized in that it simultaneously comprises circular undulations concentric with respect to its center of symmetry and rectilinear undulations radial with respect to said center of symmetry, said circular and radial undulations intersecting orthogonally.

8. A system for determining the attitude and distance of objects in an imager field of view comprising a radiation transmitter, a detector for said radiation and an object including coplanar reflectors each made up of a surface carrying a plurality of corrugations exhibiting a determinate pattern, said illuminated reflectors each sending luminous points back towards the detector with distribution along a marking alignment the shape of which depends on said corrugation pattern, said system comprising means for determining the point of convergence of at least two of said alignments, this point of convergence being the projection of the imager onto the reflector plane.

9. The system claimed in claim 8 wherein the reflectors carry concentric circular corrugations and are at least two in number and there are plural marking alignments, the reflector marking alignments being straight lines that converge at the foot point of the perpendicular dropped from the imager onto the reflector plane.

10. The system claimed in claim 8 wherein the reflectors carry corrugations running radially with respect to a center and are at least three in number and there are plural marking alignments, the reflector marking alignments being circles that cross at the foot point of the perpendicular dropped from the imager onto the reflector plane.

11. The system claimed in claim 8 wherein said system further comprises means for determining the normal to the reflector plane and the angles that the straight lines joining the imager to the ends of a diameter of the reflectors make with said normal and means for computing the distance from the imager to the reflector plane on the basis of this measured data.

12. The system claimed in claim 8 wherein said system further comprises means for determining the angle through which a spherical reflector is seen from the detector and for computing the distance from the detector to the center of the spherical reflector on the basis of this angle and the radius of the spherical reflector.

* * * * *